(12) United States Patent
Liu et al.

(10) Patent No.: US 11,050,940 B2
(45) Date of Patent: Jun. 29, 2021

(54) SCANNING METHOD OF PHOTOELECTRIC REMOTE SENSING SYSTEM

(71) Applicant: DONGGUAN FRONTIER TECHNOLOGY INSTITUTE, Dongguan (CN)

(72) Inventors: Ruopeng Liu, Shenzhen (CN); Lin Luan, Shenzhen (CN); Faguo Xu, Shenzhen (CN)

(73) Assignee: DONGGUAN FRONTIER TECHNOLOGY INSTITUTE, Dongguan (CN)

( * ) Notice: Subject to any disclaimer, the term of this patent is extended or adjusted under 35 U.S.C. 154(b) by 0 days.

(21) Appl. No.: 16/445,292

(22) Filed: Jun. 19, 2019

(65) Prior Publication Data

US 2019/0313032 A1 Oct. 10, 2019

Related U.S. Application Data

(63) Continuation of application No. PCT/CN2017/091950, filed on Jul. 6, 2017.

(30) Foreign Application Priority Data

Dec. 19, 2016 (CN) .......................... 201611178556.5

(51) Int. Cl.
*H04N 5/232* (2006.01)
*G03B 17/56* (2021.01)
*G03B 37/02* (2021.01)

(52) U.S. Cl.
CPC ....... *H04N 5/23299* (2018.08); *G03B 17/561* (2013.01); *G03B 37/02* (2013.01)

(58) Field of Classification Search
CPC ... H04N 5/23299; G03B 17/561; G03B 37/02
See application file for complete search history.

(56) References Cited

U.S. PATENT DOCUMENTS 6,130,705 A * 10/2000 Lareau ..................... G01C 3/08
  348/144
2006/0083501 A1 * 4/2006 Segal ..................... A63H 27/12
  396/7

(Continued)

FOREIGN PATENT DOCUMENTS

CN 102455425 A 5/2012
CN 102568034 A 7/2012

(Continued)

OTHER PUBLICATIONS

Machine Translation of CN103776426 (Year: 2014).*

(Continued)

*Primary Examiner* — Dave Czekaj
*Assistant Examiner* — Shanika M Brumfield
(74) *Attorney, Agent, or Firm* — Cantor Colburn LLP

(57) ABSTRACT

The present invention provides a scanning method of a photoelectric remote sensing system including the following steps: providing a photoelectric remote sensing system that is suspended in the air; and S20, driving the photographing device by the pan-tilt device to scan a target area along a plurality of circular trajectories, driving the photographing device by the pan-tilt device to switch between the circular trajectories, so as to enable a scanning area of the photographing device to cover the entire target area; and adjusting an optical parameter of the photographing device while the photographing device is switched between the circular trajectories, so as to enable pictures photographed at all scanning points to have the same spatial resolution. The scanning method of the present invention can ensure that the scanning area fully covers a target area and pictures photographed at different target points have the same spatial resolution.

19 Claims, 2 Drawing Sheets

(56) References Cited

U.S. PATENT DOCUMENTS

2008/0117294 A1     5/2008   McCutchen
2014/0362177 A1*  12/2014   Dunn .................... G03B 37/02
                                                              348/37

FOREIGN PATENT DOCUMENTS

| CN | 103345737 A | 10/2013 |
| --- | --- | --- |
| CN | 103776426 A | 5/2014 |
| CN | 205067960 U | 3/2016 |
| CN | 106199560 A * | 12/2016 |
| CN | 106249221 A * | 12/2016 |

OTHER PUBLICATIONS

International Search Report dated Oct. 12, 2017 re: Application No. PCT/CN2017/091950, pp. 1-2, citing: CN 103776426 A, CN 205067960 U, CN 103345737 A, CN 102568034 A, CN 102455425 A and US 2014362177 A1.
Supplemental EP Search Report dated Jun. 26, 2020 re: Application No. 17883688.8—1001 PCT/CN2017/091950; pp. 1-9, citing: US 2008/0117294 A1 and CN 103 776 426 A.

* cited by examiner

SCANNING METHOD OF PHOTOELECTRIC REMOTE SENSING SYSTEM

CROSS REFERENCE TO RELATED APPLICATION

This application is a continuation of International Patent Application Number PCT/CN2017/091950 filed on Jul. 6, 2017 claiming priority to Chinese Patent Application Number 201611178556.5 of Dec. 19, 2016, the contents of which said applications are herein incorporated by reference in their entirety.

TECHNICAL FIELD

The present invention relates to a scanning method of a photoelectric remote sensing system.

BACKGROUND

In existing applications of an airborne photoelectric pod, etc., an area, that is perpendicular to the photoelectric pod and is below the photoelectric pod, is mainly photographed in real time based on maneuverability of a carrier, but scanning and observing operations on a large area of ground, that are performed by the photoelectric pod statically suspended in the air, are not involved. The common scanning manner at the present stage is to scan in a rectangular trajectory. In this method, a distance of each adjacent position relative to the photoelectric pod is constantly changing. Therefore, the parameters such as an angle and a focal length of a lens need to be simultaneously controlled during the scanning process, so as to ensure that parameters such as the resolutions of pictures photographed at adjacent points are coincident to each other. As a result, in this solution, control difficulty is large, the control precision requirement is high, errors are easily generated, and so on, which is not conducive to subsequent processing such as picture splicing.

Therefore, a technology is urgently needed in the art. On one hand, it improves scanning accuracy, ensures full coverage of the area, and ensures that pictures photographed at different target points have the same spatial resolution, so as to facilitate subsequent processing; on the other hand, a time required for the scanning process needs to be reduced as much as possible.

SUMMARY

For a problem existing in a related technology, an objective of the present invention is to provide a scanning method of a photoelectric remote sensing system. The method can ensure that a scanning area fully covers a target area and pictures photographed at different target points have the same spatial resolution.

The present invention provides a scanning method of a photoelectric remote sensing system, the scanning method comprises the following steps:

S10, providing a photoelectric remote sensing system that is suspended in the air; the photoelectric remote sensing system comprising a hovering device, a pan-tilt device disposed on the hovering device, and a photographing device disposed on the pan-tilt device; and S20, driving the photographing device by the pan-tilt device to scan a target area along a plurality of circular trajectories that are concentrically surrounded, driving the photographing device by the pan-tilt device to switch between the circular trajectories, so as to enable a scanning area of the photographing device to cover the entire target area; and adjusting an optical parameter of the photographing device while the photographing device is switched between the circular trajectories, so as to enable pictures photographed at all scanning points to have the same spatial resolution.

According to the present invention, the pan-tilt device comprises an orientation framework and a pitch adjusting device disposed on the orientation framework, the photographing device is disposed on the pitch adjusting device.

According to the present invention, the scanning method further comprises: changing a radius of the circular trajectory by changing a pitch angle of the photographing device, so as to enable the photographing device to switch between the circular trajectories that are concentrically surrounded.

According to the present invention, the scanning method further comprises: changing a position of the scanning point of the photographing device in each circular trajectory by changing a horizontal angle of the orientation framework.

According to the present invention, the scanning method further comprises: adjusting the optical parameter and the pitch angle of the photographing device based on the radius of each circular trajectory and a requirement of the spatial resolution of the picture, and ensuring that the optical parameter and the pitch angle are stable during the scanning process of each circular trajectory.

According to the present invention, in the same circular trajectory, there is an overlapping ratio of the pictures photographed, by the photographing device, at two adjacent scanning points.

According to the present invention, the scanning method further comprises: determining a distance between horizontal angles of adjacent scanning points in a current circular trajectory based on a size of a single picture and a requirement of the overlapping ratio of adjacent pictures in the scanning process of the current circular trajectory.

According to the present invention, the scanning method further comprises: determining a radius $R_2$ of a next circular trajectory based on a radius $R_1$ of a current circular trajectory, a floating height H of the photographing device, and a field of view a×b of the photographing device;

wherein $R_2 = R_1 - \Delta R_1$; and $$\frac{\left(\sqrt{R_1^2 + H^2} + \sqrt{(R_1 - \Delta R_1)^2 + H^2}\right) b\pi}{450} = \Delta R_1;$$

wherein $\Delta R_1$ is a difference between the radius $R_1$ of the current circular trajectory and the radius $R_2$ of the next circular trajectory, the overlapping ratio of the pictures photographed at two adjacent scanning points is equal to 20%, a represents a horizontal angle of FOV parallel to a direction of a rotation axis that is used for adjusting a pitch angle of the photographing device, and b represents a vertical angle of FOV perpendicular to the horizontal angle of FOV; FOV represents field of view.

According to the present invention, the scanning method further comprises: adjusting the optical parameter of the photographing device based on a radius of a current circular trajectory and a field of view of an optical camera.

According to the present invention, the optical parameter comprises a size of field of view and a focal length of the photographing device.

According to the present invention, the scanning method further comprises: after one period of the scanning process is completed, determining a position relationship between the next circular trajectory and the current circular trajectory based on a related mathematical relationship; the related mathematical relationship being described by representing a photographing distance of a target at a ground distance of R according to the following formula:

$$L=\sqrt{R^2+H^2};$$

wherein the photographing distance L represents a distance between the photographing device and a photographing area along a direction of an optical axis of the photographing device; herein, an instantaneous field of view captured by the photographing device is kept unchanged at any distance;

assuming that the field of view is a×b and a size of a photographing area corresponding to a single picture is c×d (c and d respectively represent a circumferential width and a radial width of a circular trajectory of the photographing area, and have a unit of meter or kilometer), and representing c and d according to the following formulas:

$$c = L \times \pi a/180; d = L \times \pi b/180.$$

According to the present invention, the scanning method further comprises: in the circular trajectory having the same radius R, if an overlap area M % of adjacent pictures is considered, representing a quantity A of pictures required for covering the circle according to the following formula:

$$A = 2\pi R/(1-M\%)c = \frac{2\pi R}{(1-M\%)L\pi a/180} = \frac{450R}{a\sqrt{R^2+H^2}}.$$

According to the present invention, the scanning method further comprises: assuming that the radiuses of the two adjacent circular trajectories are respectively $R_1$ and $R_2$ and a distance between the two circular trajectories is $\Delta R_1$; representing $R_1$ and $R_2$ according to the following formula (1):

$$\frac{1}{2}(d_1+d_2) \times (1-M\%) = R_1 - R_2; \quad (1)$$

wherein M % represents an overlap area of adjacent pictures;

representing that the scanning and photographing processes of the entire target area are completed when $$\sum_{i=1}^{n} \Delta R_i = R,$$

and representing a total number N of photographed pictures according to the following formula (2):

$$N = \sum_{i=1}^{n+1} A_i = \sum_{i=1}^{n+1} \frac{450 R_i}{a\sqrt{R_i^2+H^2}}; \quad (2)$$

assuming that a time required for photographing the picture is $t_0$, and representing a total time t required for completing the photographing process of the entire target area according to the following formula: $t = N t_0$.

A beneficial technical effect of the present invention is described in the following section. According to the present invention, the hovering device statically suspended in the air and the photographing device operated along a plurality of circular trajectories are used. The plurality of circular trajectories cover the entire target area, thereby achieving high scanning efficiency and reducing control complexity. Optical parameters of a camera need to be adjusted only after one period of the scanning process is completed. A spatial resolution of the photoelectric remote sensing system is determined by a multiplication of a current angular resolution and a target distance. Therefore, when the optical parameters of the system are kept stable and the scanning process is performed along the same circular trajectory, pictures having completely consistent resolutions and sizes can be obtained from scanning points.

DESCRIPTION OF EMBODIMENTS

Figure 1:
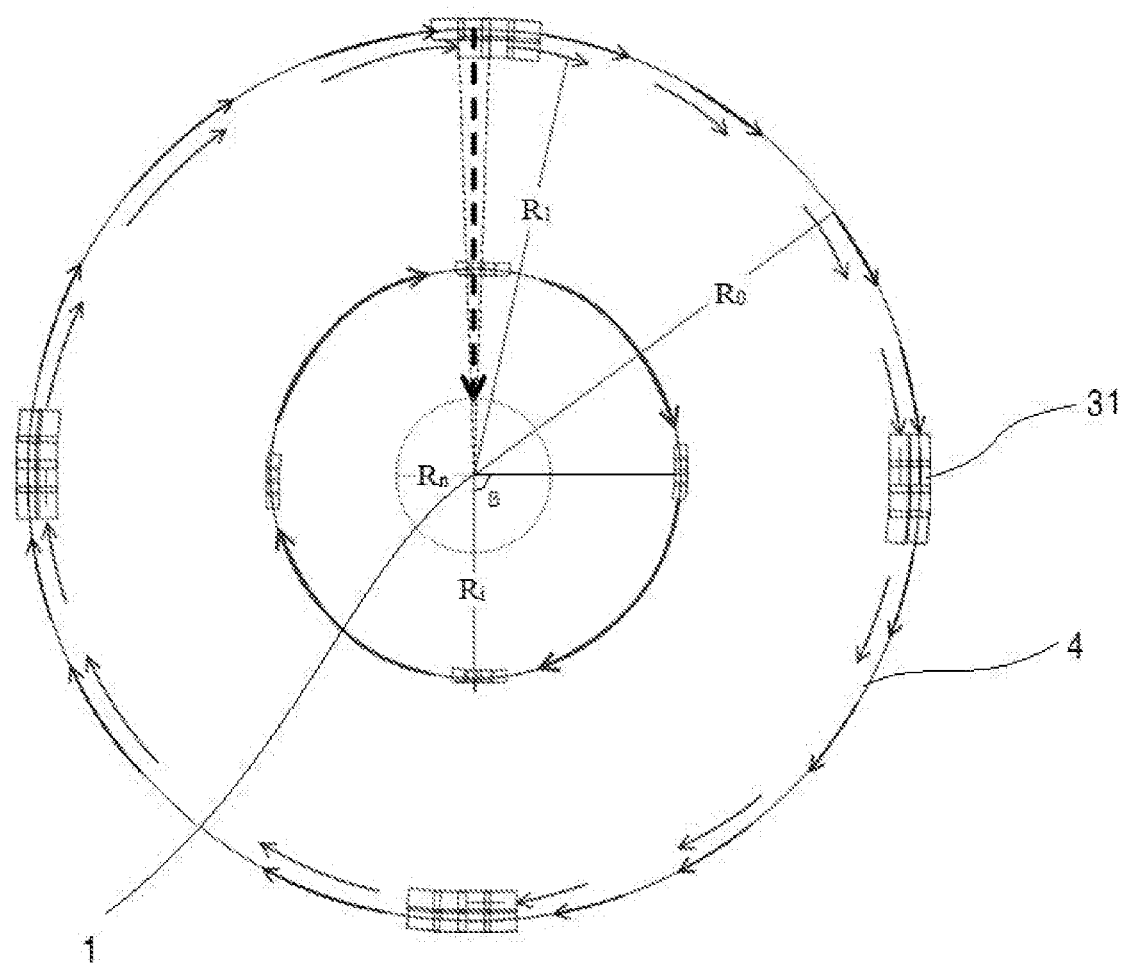
FIG. 1 is a schematic top view of a scanning area of a photoelectric remote sensing system according to the present invention.
Figure 2:
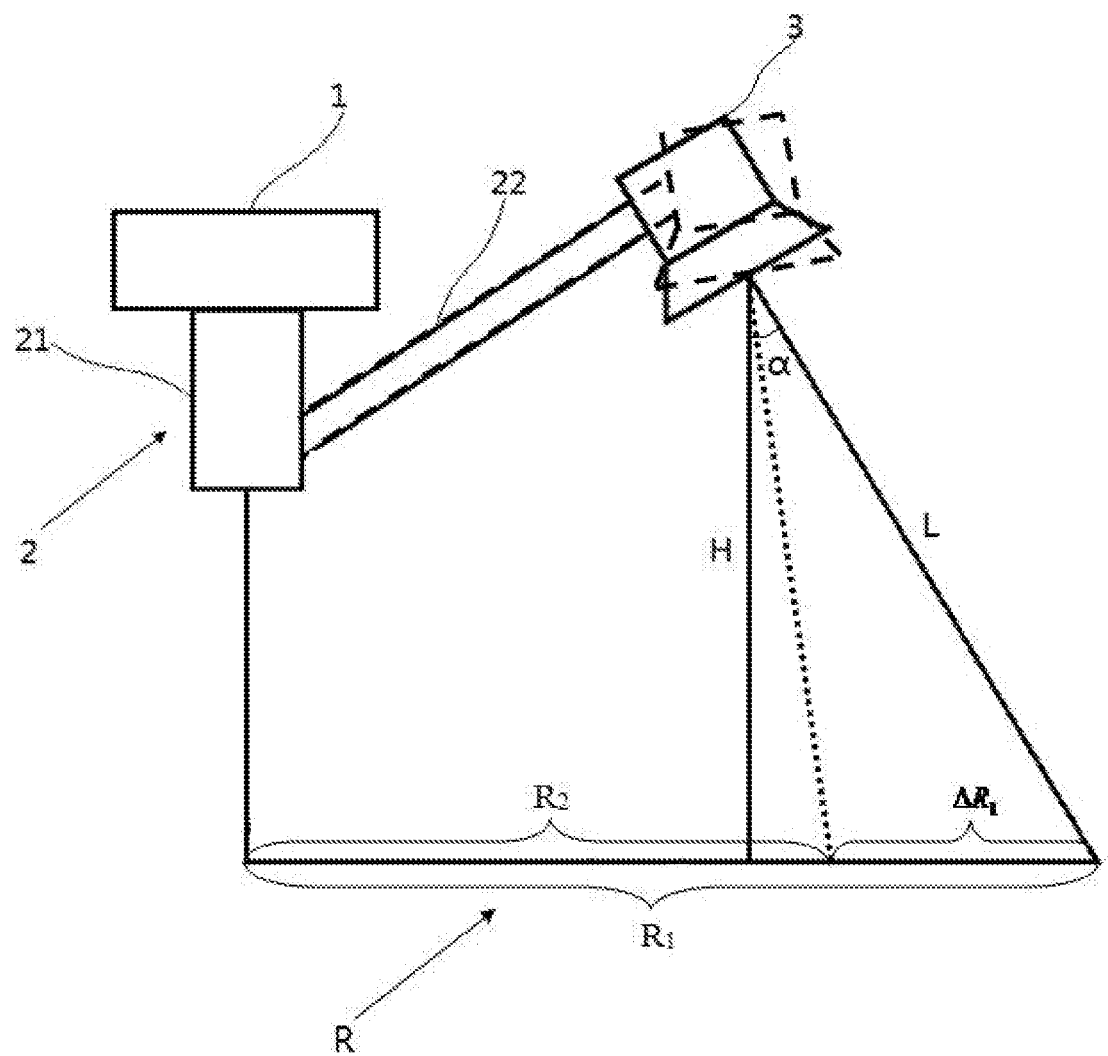
FIG. 2 is a schematic side view of a scanning area of a photoelectric remote sensing system according to the present invention.

Referring to FIG. 1 and FIG. 2, a scanning method of a photoelectric remote sensing system according to the present invention includes the following steps:

S10, providing a photoelectric remote sensing system that is suspended in the air; the photoelectric remote sensing system including a hovering device 1, a pan-tilt device 2 disposed on the hovering device 1, and a photographing device 3 disposed on the pan-tilt device 2; wherein the hovering device 1 is preferably a tethered airship and a nacelle disposed on the airship, and the pan-tilt device 2 is disposed on the nacelle. It should be understood that, in the present invention, the hovering device may also be other suitable aerostat, such as a helicopter.

S20, driving the photographing device 3 by the pan-tilt device 2 to scan a target area along a plurality of circular trajectories 4 that are concentrically surrounded; where the projection of the hovering device 1 in an area defined by the circular trajectories 4 of the pan-tilt device 2 is located in a center position of the circular trajectories 4; driving the photographing device 3 by the pan-tilt device 2 to switch between the circular trajectories 4, so as to enable a scanning area of the photographing device 3 to cover the entire target area; and adjusting an optical parameter of the photographing device 3 while the photographing device 3 is switched between the circular trajectories 4, so as to enable pictures photographed at all scanning points to have the same spatial resolution.

According to the present invention, the hovering device 1 is statically suspended in the air and the photographing device 3 operates along the circular trajectories 4, the circular trajectories 4 cover the entire target area, therefore scanning efficiency is increased and control complexity is reduced, an optical parameter of a camera is adjusted after the scanning process along each of the circular trajectories 4 is completed. Because a spatial resolution of the photoelectric remote sensing system is determined by the multiplication of a current angular resolution of the system and a target distance, when the optical parameter of the system is kept stable and the scanning process is performed along the same circular trajectory, the pictures photographed at all scanning points have the same spatial resolution and have the same size.

Referring to FIG. 2, the pan-tilt device 2 includes an orientation framework 21 and a pitch adjusting device 22 disposed on the orientation framework 21, and the photographing device 3 is disposed on the pitch adjusting device 22. The pitch adjusting device 22 and the orientation framework 21 are driven by a motor controlled by a control signal, to rotate around their respective pivots, thereby implementing continuous adjustment of the pitch angle in both the pitching direction and the horizontal direction. A pitch angle α of the photographing device 3 is changed to change a radius R of the circular trajectory 4, so as to enable the photographing device 3 to switch between the circular trajectories 4 that are concentrically surrounded. A horizontal angle β of the orientation framework 21 is changed to change a position of the scanning point of the photographing device 3 in each circular trajectory 4. The horizontal angle β may be understood as follows: an initial scanning position is given, and an included angle between a line connecting a current scanning position to a center of a circle and a line connecting the initial scanning position to the center of the circle is the horizontal angle β. It should be noted that, the radius R may be any one of radiuses $R_0$, $R_1$, $R_2$, $R_i$, and $R_n$ shown in FIG. 1 and FIG. 2. $R_0$ represents a maximum radius of the circular trajectory 4, and $R_n$ represents a minimum radius of the circular trajectory 4. In this embodiment, the pitch angle α refers to an included angle between an optical axis of the photographing device 3 and a vertical direction, and the radius R is a radius at an intersection point between the optical axis of the photographing device 3 and a scanning area. FIG. 2 is merely a schematic diagram, and is not necessarily drawn according to an actual proportion. Proper zoom-in or zoom-out for the purpose of illustration shall fall within the protection scope of the present invention.

Referring to FIG. 2, the optical parameter and the pitch angle α of the photographing device are adjusted based on the radius R of each circular trajectory 4 and a requirement of the spatial resolution of the picture, and the optical parameter and the pitch angle α are maintained to be stable in the scanning process of each circular trajectory 4.

According to the present invention, there is an overlapping ratio of pictures photographed by the photographing device 3 in two adjacent scanning points 31. Referring to FIG. 1, a size of each scanning point 31 is a size of a to-be-scanned target area covered when the photographing device 3 takes one picture. In some cases, for ease of description, the scanning point 31 is determined as a point. Preferably, the overlapping ratio is 20%. It should be understood that another proper overlapping ratio may be set depending on an actual picture splicing requirement. The overlapping ratio is a proportion of the same area in to-be-scanned areas covered by two adjacent pictures to a total area of an area covered by each picture.

According to the present invention, a distance between horizontal angles β of adjacent scanning points in a current circular trajectory is determined based on a size of a single picture and a requirement of the overlapping ratio of adjacent pictures in the scanning process of the current circular trajectory 4.

Referring to FIG. 2, a radius $R_2$ of a next circular trajectory is determined based on a radius $R_1$ of a current circular trajectory, a floating height H of the photographing device 3, and a field of view a×b (a and b represent values of angles of FOV, a unit of the angle of FOV is degree; where a represents a horizontal angle of FOV, b represents a vertical angle of FOV, and the horizontal angle of FOV is perpendicular to the vertical angle of FOV, for example, in FIG. 2, the horizontal angle of FOV is the angle of FOV in a direction perpendicular to a paper surface, namely, the angle of FOV is parallel to a direction of a rotation axis that is used for adjusting a pitch angle of the photographing device 3; and the vertical angle of FOV is the angle of FOV in a direction within the paper surface, namely, the angle of FOV is perpendicular to the horizontal angle of FOV; FOV represents field of view) of the photographing device 3.

wherein, $R_2 = R_1 - \Delta R_1$;

$$\frac{\left(\sqrt{R_1^2 + H^2} + \sqrt{(R_1 - \Delta R_1)^2 + H^2}\right)b\pi}{450} = \Delta R_1;$$

wherein $\Delta R_1$ is a difference between the radius $R_1$ of the current circular trajectory 4 and the radius $R_2$ of the next circular trajectory 4, and the overlapping ratio of the pictures photographed at two adjacent scanning points 31 is equal to 20%.

According to the present invention, the optical parameter of the photographing device 3 is adjusted based on a radius of a current circular trajectory 4 and a field of view of an optical camera. The optical parameter includes a size of field of view and a focal length of the photographing device 3. The size of field of view is adjusted by adjusting a value of the angle of FOV.

Specifically, in one embodiment, for example, the scanning method of a photoelectric remote sensing system in the present invention may be described as the following section.

(1) Adjusting an optical parameter of a photographing device and a pitch angle α of the photographing device based on a maximum radius of a to-be-scanned target area and a requirement of the spatial resolution of a picture, ensuring that the optical parameter and the pitch angle α are stable, and marking a current horizontal angle as a starting point of the scanning process.

(2) Determining a distance between horizontal angles of adjacent points in a current circular trajectory based on a size of a single picture and a requirement of overlapping ration of adjacent pictures in the current circular trajectory, and determining a rotation time based on a rotational angular speed and a horizontal angle of a pan-tilt device. In addition, the related parameters for automatically controlling the pan-tilt device are set based on a time required for performing photographing at each scanning point.

(3) After one period of the scanning process is completed, determining a position relationship between a next circular trajectory and the current circular trajectory based on a related mathematical relationship. The mathematical relationship is described as follows.

Assuming that a floating height of the photographing device is H, representing a photographing distance L of a target at a ground distance of R according to the following formula (1).

$$L = \sqrt{R^2 + H^2} \qquad (1)$$

wherein the photographing distance L represents a distance between the photographing device (herein, it may be assumed that the photographing device is a point) and a photographing area along a direction of an optical axis of the photographing device; herein, an instantaneous field of view captured by the photographing device is kept unchanged at any distance.

Assuming that the field of view is a×b and a size of a photographing area corresponding to a single picture is c×d (c and d respectively represent a circumferential width and a radial width of a circular trajectory of the photographing area, and have a unit of meter or kilometer); representing c and d according to the following formulas (2) and (3).

$$c = L \times \pi a / 180 \qquad (2)$$

$$d = L \times \pi b / 180. \qquad (3)$$

In the circular trajectory having the same radius R, if an overlap area M % of adjacent pictures is considered, where a preferred overlap area is 20%, representing a quantity A of pictures required for covering the circle according to the following formula:

$$A = 2\pi R / (1 - M\%)c = \frac{2\pi R}{(1 - M\%)L\pi a/180} = \frac{450R}{a\sqrt{R^2 + H^2}};$$

and when the overlap area is 20%;

$$A = 2\pi R / 0.8c = \frac{2\pi R}{0.8 L \pi a / 180} = \frac{450R}{a\sqrt{R^2 + H^2}}. \qquad (4)$$

It can be learned from the above formula (4) that the quantity A of pictures of a single circle is only related to R when H and a are kept unchanged. There is an assumption in the above formula (4): horizontal angles of two adjacent pictures are very small, and therefore an arc, of the circle, that is corresponding to the picture can be regarded as a line segment.

Assuming that the radiuses of the two adjacent circular trajectories are respectively $R_1$ and $R_2$, and a distance between the two circular trajectories is $\Delta R_1$; representing $R_1$ and $R_2$ according to the following formula:

$$\tfrac{1}{2}(d_1 + d_2) \times (1 - M\%) = R_1 - R_2.$$

And when the overlap area is 20%, representing the formulas (5) and (6) as the following section.

$$\frac{1}{2}(d_1 + d_2) \times 0.8 = R_1 - R_2; \qquad (5)$$

$$\frac{\left(\sqrt{R_1^2 + H^2} + \sqrt{(R_1 - \Delta R_1)^2 + H^2}\right) b\pi}{450} = \Delta R_1; \qquad (6)$$

Representing that the scanning and photographing processes of an entire target area are completed when $$\sum_{i=1}^{n} \Delta R_i = R;$$

and representing a total number N of photographed pictures according to the following formula (8).

$$N = \sum_{i=1}^{n+1} A_i = \sum_{i=1}^{n+1} \frac{450 R_i}{a\sqrt{R_i^2 + H^2}}; \qquad (8)$$

Assuming that a time required for photographing the picture is $t_0$, representing a total time t required for completing the photographing process according to the following formula (9):

$$t = N t_0. \qquad (9)$$

Determining an adjustment amount of the pitch angle of the pan-tilt device and the optical parameter of the photographing device, and completing the adjustment of a photographing posture. Wherein d1 and d2 are radial widths of a photographing area corresponding to each picture of the circular trajectories whose radiuses are $R_1$ and $R_2$ respectively, $A_i$ is a quantity of pictures of an circular trajectory.

(4) Repeating the step 1 to the step 3, until the scanning process of the entire target area is completed.

A changing amount of adjacent radiuses R and an actual photographing distance L corresponding to any radius R are determined based on the mathematic expression in the aforementioned step 3. At the same time, based on an FOV (field of view) theory of an optical camera, if the photographing distance and a target surface of the camera are determined, a size of field of view is linearly and inversely proportional to a focal length of the camera. Depending on an actual requirement, if a phase and an amplitude need to be kept consistent (values of c and d in the aforementioned formula are kept unchanged), values of angle of FOVs (a and b) need to be adjusted as the radius R changes, and an optical parameter such as the focal length of the camera also needs to be adjusted simultaneously. The controlling of an angle of the pan-tilt device and the precise auto-controlling and adjusting of the optical parameter of the camera are completed through programming According to the estimation, when a conventional aerial camera is suspended in the air and has a height of 1 km, the conventional aerial camera requires about 13 minutes to complete scanning of the area having a radius of 10 km, so as to effectively complete scanning of the area.

Based on the current optical parameter and the target distance of the photoelectric remote sensing system, a related algorithm is used to determine a rotational speed and a stopping position of the pan-tilt device and complete automatic controlling. After one period of the scanning process is completed, parameters such as the new target distance and the optical focal length are determined according to the related algorithm, and a photographing posture of the photoelectric remote sensing system is adjusted, until the scanning of the entire target area is completed.

Compared with the existing scanning method, the scanning method of a photoelectric remote sensing system in the present invention can provide a more efficient operation mode for scanning the area. Such that the system can automatically scan and monitor a large area of the ground in a short time as short as possible, obtain global picture information, and maintain high scanning accuracy while reducing the difficulty of auto-controlling.

In the present invention, a radial-direction circular scanning manner is designed in combination with an inherent property of camera photographing, and is a more novel idea. New practical methods can be developed under new ideas to implement subsequent control, picture processing, and the like.

The foregoing descriptions are merely preferred embodiments of the present invention, but are not intended to limit the present invention. For a person skilled in the art, the present invention may have various changes and variations. Any modification, equivalent replacement, or improvement made within the spirit and principle of the present invention shall fall within the protection scope of the present invention.

What is claimed is:

1. A scanning method of a photoelectric remote sensing system, comprising the following steps:
S10, providing a photoelectric remote sensing system that is suspended in the air; the photoelectric remote sensing system comprising a hovering device, a pan-tilt device disposed on the hovering device, and a photographing device disposed on the pan-tilt device; and
S20, driving the photographing device by the pan-tilt device to scan a target area along a plurality of circular trajectories that are concentrically surrounded, driving the photographing device by the pan-tilt device to switch between the circular trajectories, so as to enable a scanning area of the photographing device to cover the entire target area; and adjusting an optical parameter of the photographing device while the photographing device is switched between the circular trajectories, so as to enable pictures photographed at all scanning points to have the same spatial resolution;
the scanning method further comprising:
determining a radius $R_2$ of a next circular trajectory based on a radius $R_1$ of a current circular trajectory, a floating height H of the photographing device, and a field of view a×b of the photographing device;
wherein $R_2 = R_1 - \Delta R_1$; and $$\frac{\left(\sqrt{R_1^2 + H^2} + \sqrt{(R_1 - \Delta R_1)^2 + H^2}\right) b\pi}{450} = \Delta R_1;$$

wherein $\Delta R_1$ is a difference between the radius $R_1$ of the current circular trajectory and the radius $R_2$ of the next circular trajectory, the overlapping ratio of the pictures photographed at two adjacent scanning points is equal to 20%, a represents a horizontal angle of FOV parallel to a direction of a rotation axis that is used for adjusting a pitch angle of the photographing device, and b represents a vertical angle of FOV perpendicular to the horizontal angle of FOV; FOV represents field of view.

2. The scanning method of a photoelectric remote sensing system according to claim 1, wherein the pan-tilt device comprises an orientation framework and a pitch adjusting device disposed on the orientation framework, the photographing device is disposed on the pitch adjusting device.

3. The scanning method of a photoelectric remote sensing system according to claim 2, further comprising:
changing a radius of the circular trajectory by changing a pitch angle of the photographing device, so as to enable the photographing device to switch between the circular trajectories that are concentrically surrounded.

4. The scanning method of a photoelectric remote sensing system according to claim 3, further comprising:
adjusting the optical parameter and the pitch angle of the photographing device based on the radius of each circular trajectory and a requirement of the spatial resolution of the picture, and ensuring that the optical parameter and the pitch angle are stable during the scanning process of each circular trajectory.

5. The scanning method of a photoelectric remote sensing system according to claim 2, further comprising:
changing a position of the scanning point of the photographing device in each circular trajectory by changing a horizontal angle of the orientation framework.

6. The scanning method of a photoelectric remote sensing system according to claim 1, wherein in the same circular trajectory, there is an overlapping ratio of the pictures photographed, by the photographing device, at two adjacent scanning points.

7. The scanning method of a photoelectric remote sensing system according to claim 6, further comprising:
determining a distance between horizontal angles of adjacent scanning points in a current circular trajectory based on a size of a single picture and a requirement of the overlapping ratio of adjacent pictures in the scanning process of the current circular trajectory.

8. The scanning method of a photoelectric remote sensing system according to claim 1, further comprising:
adjusting the optical parameter of the photographing device based on a radius of a current circular trajectory and a field of view of an optical camera.

9. The scanning method of a photoelectric remote sensing system according to claim 1, wherein the optical parameter comprises a size of field of view and a focal length of the photographing device.

10. The scanning method of a photoelectric remote sensing system according to claim 1, further comprising:
after one period of the scanning process is completed, determining a position relationship between the next circular trajectory and the current circular trajectory based on a related mathematical relationship; the related mathematical relationship being described by representing a photographing distance of a target at a ground distance of R according to the following formula: $L = \sqrt{R^2 + H^2}$;
wherein the photographing distance L represents a distance between the photographing device and a photographing area along a direction of an optical axis of the photographing device; herein, an instantaneous field of view captured by the photographing device is kept unchanged at any distance;
assuming that the field of view is a×b and a size of a photographing area corresponding to a single picture is c×d (c and d respectively represent a circumferential width and a radial width of a circular trajectory of the photographing area, and have a unit of meter or kilometer), and representing c and d according to the following formulas:
$c = L \times \pi a/180; d = L \times \pi b/180.$ 11. The scanning method of a photoelectric remote sensing system according to claim 10, further comprising:
assuming that the radiuses of the two adjacent circular trajectories are respectively $R_1$ and $R_2$ and a distance between the two circular trajectories is $\Delta R_1$; representing $R_1$ and $R_2$ according to the following formula (1):

$$\frac{1}{2}(d_1 + d_2) \times (1 - M\%) = R_1 - R_2; \qquad (1)$$

wherein M % represents an overlap area of adjacent pictures;
representing that the scanning and photographing processes of the entire target area are completed when $$\sum_{i=1}^{n} \Delta R_i = R,$$

and representing a total number N of photographed pictures according to the following formula (2):

$$N = \sum_{i=1}^{n+1} A_i = \sum_{i=1}^{n+1} \frac{450 R_i}{a\sqrt{R_i^2 + H^2}}; \quad (2)$$

assuming that a time required for photographing the picture is $t_0$, and representing a total time t required for completing the photographing process of the entire target area according to the following formula: $t = N t_0$.

12. The scanning method of a photoelectric remote sensing system according to claim 1, further comprising:
in the circular trajectory having the same radius R, if an overlap area M % of the adjacent pictures is considered, representing a quantity A of pictures required for covering the circle according to the following formula:

$$A = 2\pi R/(1 - M\%)c = \frac{2\pi R}{(1 - M\%) L \pi a/180} = \frac{450 R}{a\sqrt{R^2 + H^2}}.$$

13. A photoelectric remote sensing system suspended in the air and comprising:
a hovering device, a pan-tilt device disposed on the hovering device, and a photographing device disposed on the pan-tilt device;
wherein the pan-tilt device is configured to drive the photographing device to scan a target area along a plurality of circular trajectories that are concentrically surrounded and drive the photographing device to switch between the circular trajectories, so as to enable a scanning area of the photographing device to cover the entire target area; an optical parameter of the photographing device is adjusted while the photographing device is switched between the circular trajectories, so as to enable pictures photographed at all scanning points to have the same spatial resolution;
wherein the photoelectric remote sensing system is further configured to:
determine a radius $R_2$ of a next circular trajectory based on a radius $R_1$ of a current circular trajectory, a floating height H of the photographing device, and a field of view a×b of the photographing device;
wherein $R_2 = R_1 - \Delta R_1$; and $$\frac{\left(\sqrt{R_1^2 + H^2} + \sqrt{(R_1 - \Delta R_1)^2 + H^2}\right) b\pi}{450} = \Delta R_1;$$

wherein $\Delta R_1$ is a difference between the radius $R_1$ of the current circular trajectory and the radius $R_2$ of the next circular trajectory, the overlapping ratio of the pictures photographed at two adjacent scanning points is equal to 20%, a represents a horizontal angle of FOV parallel to a direction of a rotation axis that is used for adjusting a pitch angle of the photographing device, and b represents a vertical angle of FOV perpendicular to the horizontal angle of FOV; FOV represents field of view.

14. The photoelectric remote sensing system according to claim 13, wherein the pan-tilt device comprises an orientation framework and a pitch adjusting device disposed on the orientation framework, the photographing device is disposed on the pitch adjusting device.

15. The photoelectric remote sensing system according to claim 14, wherein a radius of the circular trajectory is changed by changing a pitch angle of the photographing device, so as to enable the photographing device to switch between the circular trajectories that are concentrically surrounded.

16. The photoelectric remote sensing system according to claim 15, wherein the optical parameter and the pitch angle of the photographing device are adjusted based on the radius of each circular trajectory and a requirement of the spatial resolution of the picture, and the optical parameter and the pitch angle are ensured to be stable during the scanning process of each circular trajectory.

17. The photoelectric remote sensing system according to claim 14, wherein a position of the scanning point of the photographing device in each circular trajectory is changed by changing a horizontal angle of the orientation framework.

18. The photoelectric remote sensing system according to claim 13, wherein in the same circular trajectory, there is an overlapping ratio of the pictures photographed, by the photographing device, at two adjacent scanning points.

19. The photoelectric remote sensing system according to claim 18, wherein a distance between horizontal angles of adjacent scanning points in a current circular trajectory is determined based on a size of a single picture and a requirement of the overlapping ratio of adjacent pictures in the scanning process of the current circular trajectory.

* * * * *